3,092,544
ORGANO PHOSPHOROUS NEMATOCIDE
Joyce D. Nault, Garden Grove, and Charles R. Youngson, Long Beach, Calif., assignors to The Dow Chemical Company, Midland, Mich., a corporation of Delaware
No Drawing. Filed Nov. 3, 1961, Ser. No. 149,847
10 Claims. (Cl. 167—30)

The present invention is concerned with the treatment of soil or growth media and is particularly directed to a method for the control of soil inhabiting nematodes which attack the underground parts of plants and improving the ability of soil to support plant growth.

It is an object of the present invention to provide an improved method for the treating and disinfection of soil infested with nematodes. A further object is the provision of a method for improving the ability of soil to support plant growth. Other objects will become apparent from the following specification and claims.

The new agronomical practice comprises treating soil or growth media with a phosphorus compound corresponding to the formula

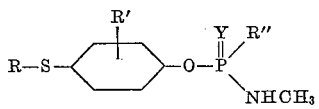

wherein R represents methyl or ethyl, R' represents hydrogen or methyl, Y represents oxygen or sulfur; and R" represents methoxy or methylamino. The new practice has been found to improve the ability of soil to support plant growth and to protect the plants from the ravages of soil dwelling plant pathogenic nematodes which attack their roots. It has been further found that the treatment with the phosphorus compounds improves the growth characteristics of crops raised thereon. Thus, crops grown on the treated and improved soil have more luxuriant tops, fruit and roots and are of a greater total weight than those obtained from untreated soil.

The phosphorus compounds are crystalline solids or viscous liquids which are somewhat soluble in many organic solvents and of low solubility in water. They are adapted to be readily and conveniently distributed in soil. Further, when so employed, the compounds accomplish a substantially complete kill of nematodes, and induce soil changes which improve the ability of the soil to support plant growth and the growth characteristics of crops raised on the treated soil. It is among the advantages of the present invention that the compounds, while sufficiently persistent to accomplish the desired effect upon the soil and upon the soil inhabiting organisms dissipate in a reasonable period of time.

The distribution of at least a minimum effective dosage of the phosphorus compounds in soil is essential and critical for the practice of the present invention. In general, good improvements in the ability of soil to support plant growth and good controls of nematodes are obtained when the compounds are distributed in the soil in the amount of at least 0.1 part by weight per million parts by weight of soil. In the preferred practice, the compounds are usually distributed in the soil in amounts not greater than about 100 parts by weight per million. In field applications, the phosphorus compounds may be distributed in the soil at a dosage of from 0.02 to 400 pounds or more per acre and through such a cross section of soil as to provide for the presence therein of an effective concentration of the treating agent. In general field applications, it is usually preferred that the compounds be distributed to a depth of from 3 to 6 inches. Oftentimes, it is desirable to distribute the compounds to a depth of 24 or more inches to avoid reinfestation of the soil from deep dwelling nematodes which cause plant disease, or through that section of the soil known as the root zone as in raw treatments.

In one embodiment of the invention, the treated soil is planted with the desired crop plant following the distribution of the phosphorus compounds in the soil. Where minimum dosages of the compounds are distributed in soil, the treated soil may be immediately planted with the desired crop. Following the distribution of larger dosages of the phosphorus compounds, it is desirable that any planting operation not be carried out for a period of several days, the exact period depending upon the concentration of the phosphorus compounds in the soil and the resistance of the plant species concerned to the compound. Where the compounds are employed for the treatment of the soil adjacent to the root systems of established plants having resistance to the phosphorus compounds, the existing vegetation is not unfavorably affected by minimum effective concentrations of the phosphorus compounds temporarily present in the soil.

The method of the present invention can be carried out by distributing the unmodified phosphorus compounds through the growth medium as by impregnation. However, the present method also embraces the employment of a liquid or dust composition containing the toxicants. In such usage, the phosphorus compounds are modified with one or a plurality of additaments or soil treating or parasiticide adjuvants, including water or other liquid carriers, surface active dispersing agents and finely divided inert solids. Depending upon the concentration of toxicant such augmented compositions are adapted to be distributed in the soil, or employed as concentrates and subsequently diluted with additional inert carrier to produce the ultimate treating compositions. The required amount of the phosphorus compounds in the growth media conveniently can be supplied per acre treated in from five gallons to five acre inches or more of the liquid carrier or in from about 20 to 2,000 pounds of the solid carrier. In the modified compositions, the carrier cooperates with the active ingredient to obtain an advantage and to contribute to the usefulness and effectiveness of the invention.

The exact concentration of the phosphorus compounds to be employed in compositions for the treatment of growth media can vary provided the required dosage of effective agent is supplied in the medium. The concentration of toxicant in liquid compositions employed to supply the desired dosage generally is from about 0.000025 to 50 percent by weight, although compositions containing as high as 90 percent are sometimes employed. In dusts, the concentration of toxicant may be from about 0.01 to 20 percent by weight. In compositions to be employed as concentrates, the toxicant can be present in a concentration of from about five to 95 percent by weight.

Liquid compositions containing the desired amount of the phosphorus compounds are prepared by dispersing the toxicant in water with the aid of a suitable surface active dispersing agent such as an ionic or non-ionic emulsifying agent. Such compositions may contain from one or more water immiscible solvents for the phosphorus compounds. In such compositions, the carrier comprises an aqueous emulsion, i.e. a mixture of water immiscible solvent, emulsifying agent and water. The choice of dispersing and emulsifying agent and the amount thereof employed is dictated by the nature of the composition type and by the ability of the agent to facilitate the dispersion of the phosphorus compounds in the aqueous carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the phosphorus compounds are dispersed in and on a finely divided inert solid such as talc, chalk, gypsum and the like. In such operations, the carrier is mechanically ground with the compound or wet with a volatile organic solvent solution thereof. Similarly, dust compositions containing the compounds can be prepared from various of the solid surface active dispersing agents, such as bentonite, fuller's earth, attapulgite and other clays. Depending upon the proportions of ingredients, these dust compositions can be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions can be dispersed in water with or without the aid of a dispersing agent to form aqueous soil treating compositions.

When operating in accordance with the present invention, the soil can be impregnated with the phosphorus compounds, or a composition containing the toxicants, in any convenient fashion, e.g. by simple mixing with the soil, by applying to the surface of soil and thereafter dragging or discing into the soil to the desired depth or by employing water to accomplish the penetration and impregnation. In a preferred procedure, the impregnation is carried out with the water employed to irrigate the soil.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any substances or media in which vegetation may take root and grow, and are intended to include not only earth but compost, manure, muck, humus, and sand and the like, adapted to support plant growth.

The following examples illustrate the invention but are not to be construed as limiting the same.

*Example 1*

Acetone solutions containing 5 grams of various of the phosphorus compounds per liter of solution are dispersed in water to prepare aqueous compositions containing 1.25 parts by weight of one of the phosphorus compounds per million parts by weight of ultimate mixture. These compositions are employed for the treatment of seed beds of sandy loam soil which are heavily infested with root knot nematodes. The soil is of good nutrient content and contains about 58 percent sand, 27 percent silt and 15 percent clay. In the treating operations, the aqueous compositions are applied to the seed beds as a soil drench and in an amount sufficient to supply about 1.5 pounds of one of the phosphorus compounds per acre foot of soil. The latter dosage corresponds to a concentration of about 0.38 part by weight of phosphorus compound per million parts by weight of soil. Following the treating operations, the average soil temperature remains at about 62° F. for the period of the determination.

One week after treatment, the seed beds are planted with cucumber seeds. Adjacent untreated seed beds are also planted with cucumber seeds to serve as checks. During the subsequent growing period no adverse effect upon the germination and growth of seedlings attributable to the presence of the phosphorus compounds is observed. About 5 weeks after planting, the plants are lifted from the soil and the roots washed and examined for gall formation attributable to nematode attack to determine what percent kill of nemaodes has been obtained in the treated soil. The phosphorus compounds employed and results obtained are set forth in the following table:

| Test compound: | Percent kill of nematodes |
|---|---|
| O-(4-methylthiophenyl) O-methyl N-methyl phosphoramidothioate | 98 |
| O-(4-ethylthiophenyl) O-methyl N-methyl phosphoramidothiate | 80 |
| O-(4-methylthio-3-methylphenyl) O-methyl N-methyl phosphoramidothioate | 75 |
| O-(4-methylthiophenyl) N,N'-dimethyl phosphorodiamidothioate | 85 |
| O-(4-methylthiophenyl) N,N'-dimethyl phosphorodiamidate | 82 |

At the time of the observations, the plants from the untreated check beds are found to be stunted and dwarfed, and their roots heavily covered with galls attributable to the attack of root knot nematodes.

*Example 2*

Acetone solutions containing 5 grams of various of the phosphorus compounds per liter of solution are dispersed in water to prepare aqueous compositions containing about 5 parts by weight of one of the phosphate compounds per million parts by weight of ultimate mixture. These compositions are employed in an exactly comparable operation for the treatment of seed beds containing a very heavy infestation of root knot nematodes. In the treating operations, the aqueous compositions are applied to the seed beds as a soil drench and in an amount sufficient to supply 6 pounds of one of the phosphate compounds per acre foot of soil. The latter dosage corresponds to a concentration of about 1.5 parts by weight of phosphorus compound per million parts by weight of soil.

One week after treatment, the seed beds are planted with cucumber seeds. Adjacent untreated seed beds are also planted with cucumber seeds to serve as checks. During the subsequent growing period, there is observed no adverse effect upon the germination and growth of seedlings attributable to the presence of phosphorus compound. About five weeks after planting, the plants are lifted from the soil and the roots washed and examined for gall formation attributable to nematode attack to determine what control of nematodes had been obtained in the treated soil. The phosphorus compounds employed and results obtained are set forth in the following table.

| Test compound: | Percent kill of nematodes |
|---|---|
| O-(4-methylthiophenyl) O-methyl N-methyl phosphoramidothioate | 100 |
| O-(4-methylthio-3-methylphenyl) O-methyl N-methyl phosphoramidothioate | 100 |
| O-(4-methylthiophenyl) O-methyl N-methyl phosphoramidate | 100 |
| O-(4-methylthiophenyl) N,N'-dimethyl phosphorodiamidothioate | 100 |
| O-(4-methylthiophenyl) N,N'-dimethyl phosphorodiamidate | 100 |

At the time of the observations, the plants from the untreated check beds are found to be dwarfed and their roots covered with galls attributable to the attack of root knot nematodes.

*Example 3*

An acetone solution containing 5 grams of O-(4-methylthiophenyl) N,N'-dimethyl phosphorodiamidothioate per liter of solution is dispersed in water to prepare an aqueous composition containing 0.62 part by weight of phosphorus compound per million parts by weight of ultimate mixture. This composition is employed for the treatment of seed beds of sandy loam soil which are heavily infested with root knot nematodes. The soil is of good nutrient content and contains about 58 percent sand, 27 percent silt and 15 percent clay. In the treating operations, the aqueous compositions are applied to the seed beds as a soil drench and in an amount sufficient to supply about 0.75 pound of the phosphorus compound per acre foot of soil. The latter dosage corresponds to a concentration of about 0.19 part by weight of phosphorus compound per million parts by weight of soil. Following treatment, the average soil temperature remained at about 62° F. for the period of the determination.

One week after treatment, the seed beds are planted with cucumber seeds. Adjacent untreated seed beds are also planted with cucumber seeds to serve as checks. During the subsequent growing period, no adverse effect upon the germination and growth of seedlings attributable to the presence of the phosphorus compound is observed. About 5 weeks after planting, the plants are lifted from the soil and the roots washed and examined for gall formation attributable to nematode attack to determine what percent kill of nematodes has been obtained in the treated soil. The observations showed a 75 percent kill of nematodes in the treated soil, with the untreated check soil showing a very heavy population of nematodes.

*Example 4*

O-(4-ethylthio-2-methylphenyl) O-methyl N-methyl phosphoramidate, O-(4-ethylthio-2-methylphenyl) N,N'-dimethyl phosphorodiamidothioate, O-(4-ethylphenyl) N,N'-dimethyl phosphorodiamidate, O-(4-ethylphenyl) O-methyl N-methyl phosphoramidate, O-(4-methylthio-2-methylphenyl) N,N'-dimethyl phosphorodiamidate, and the phosphorus compounds identified in the foregoing examples are each mixed with xylene and a dimeric alkylated aryl polyethyl alcohol (Triton X–155) to prepare concentrate compositions in the form of emulsifiable liquids containing 50 parts by weight of one of the phosphorus compound, 45 parts of xylene and 5 parts of Triton X–155.

O-(4-ethylthio-2-methylphenyl) O-methyl N-methyl phosphoramidate, O-(4-ethylthio-2-methylphenyl) N,N'-dimethyl phosphorodiamidothioate, O-(4-ethylphenyl) N,N'-dimethyl phosphorodiamidate, O-(4-ethylphenyl) O-methyl N-methyl phosphoramidate, O-(4-methylthio-2-methylphenyl) N,N'-dimethyl phosphorodiamidate, and the phosphorus compounds identified in the foregoing examples are mixed with xylene and an alkyl aryl sulfonate (Octo–700) to produce emulsifiable concentrate compositions containing 30 parts by weight of one of the phosphorus compounds, 60 parts of xylene and 10 parts of Octo–700.

These emulsifiable concentrate compositions are adapted to be dispersed in water to produce aqueous compositions having very desirable wetting and penetrating properties. The latter aqueous compositions are adapted to be employed to treat soil and distribute the phosphorus compounds therein in effective and nematocidal concentrations.

The phosphorus compounds as employed in accordance with the foregoing teachings are prepared by known methods. Thus, the compounds can be prepared by reacting phosphorus oxychloride or phosphorus thiochloride successively with (1) methyl amine, (2) methanol and (3) an aryl alcohol corresponding to the formula

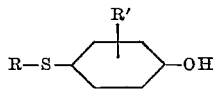

In such procedure, the amidation can be first effected and the amidated product thereafter successively esterified with the two alcohols. In an alternative procedure, the phosphorus oxychloride or phosphorus thiochloride is esterified in either order with the two alcohols and the resulting product thereafter amidated. In an additional procedure, the phosphorus oxychloride or phosphorus thiochloride is first esterified with one of the alcohols, amidated and the amidated product thereafter esterified with the remaining alcohol. The esterification and amidation are carried out in the presence of an acid binding agent or hydrogen chloride acceptor and in a liquid reaction medium such as an organic solvent. The reactions take place readily at temperatures at which chloride of reaction is produced. Good results are obtained when operating at temperatures of from —10° to 80° C. and employing one molecular proportion of phosphorus oxychloride or phosphorus thiochloride with one molecular proportion of each of the esterifying reagents and of the amidating reagent. Following the reaction, the desired product is separated by conventional procedures.

We claim:

1. An agronomical practice which comprises impregnating nematode infested soil with a nematocidal amount of a phosphorus compound corresponding to the formula

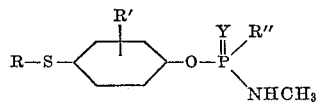

wherein R represents a member of the group consisting of methyl and ethyl, R' represents a member of the group consisting of hydrogen and methyl, R'' represent a member of the group consisting of methoxy and methylamino and Y represents a member of the group consisting of oxygen and sulfur.

2. An agronomical practice which comprises inpregnating nematode infested soil with a phosphorus compound in the amount of at least 0.1 part by weight per million parts by weight of soil, the phosphorus compound having the formula

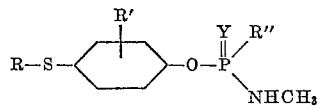

wherein R represents a member of the group consisting of methyl and ethyl, R' represents a member of the group consisting of hydrogen and methyl, R'' represents a member of the group consisting of methoxy and methylamino and Y represents a member of the group consisting of oxygen and sulfur.

3. The method claimed in claim 2 wherein the impregnation is carried out with a composition made up of the phosphorus compound in admixture with a soil treating adjuvant as a carrier therefor.

4. An agronomical practice which comprises impregnating nematode infested soil with the phosphate compound at a substantially uniform dosage of at least 0.02 pound per acre, the impregnation being carried out through such a cross section of the soil as to provide for the presence therein of from 0.1 to 100 parts by weight of the phosphorus compound per million parts by weight of soil and the phosphate compound having the formula

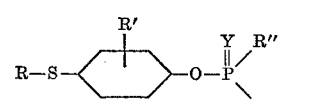

wherein each R represents a member of the group consisting of methyl and ethyl, R' represents a member of the group consisting of hydrogen and methyl, R'' represents a member of the group consisting of methoxy and methylamino and Y represents a member of the group consisting of oxygen and sulfur.

5. An agronomical practice which comprises impregnating nematode infested soil with a nematocidal amount of O-(4-methyl-thiophenyl) O-methyl N-methyl phosphoramidothioate.

6. An agronomical practice which comprises impregnating nematode infested soil with a nematocidal amount of O-(4-methyl-thio-3-methylphenyl) O-methyl N-methyl phosphoramidothioate.

7. An agronomical practice which comprises impregnating nematode infested soil with a nematocidal amount of O-(4-ethylthiophenyl) O-methyl N-methyl phosphoramidothioate.

8. An agronomical practice which comprises impregnating nematode infested soil with a nematocidal amount of O-(4-methylphenyl) O-methyl N-methyl phosphoramidate.

9. An agronomical practice which comprises impregnating nematode infested soil with a nematocidal amount of O-(4-methylthiophenyl) N,N'-dimethyl phosphorodiamidothioate.

10. An agronomical practice which comprises impregnating nematode infested soil with a nematocidal amount of O-(4-methylthiophenyl) N,N'-dimethyl phosphorodiamidate.

References Cited in the file of this patent

UNITED STATES PATENTS 2,978,479    Kayser _____ Apr. 4, 1961